July 6, 1971  S. BINIECKI ET AL  3,591,588
PROCESS FOR THE PREPARATION OF 1-CARBOETHOXY-
HYDRAZINOPHTHALAZINE HYDROCHLORIDE
Filed Oct. 29, 1968

Inventors: Stanislaw Biniecki
Stanislaw Chachula
Helena Jozwiak
Zbigniew Ludwicki
Stefan Labedzki
Wiktor Pietrzak
Stanislaw Pieta
Stanislaw Paradowski

United States Patent Office 3,591,588
Patented July 6, 1971

3,591,588
PROCESS FOR THE PREPARATION OF 1-CARBO-ETHOXYHYDRAZINOPHTHALAZINE HYDROCHLORIDE
Stanislaw Biniecki, Warsaw, and Stanislaw Chachula, Helena Jozwiak, Zbigniew Ludwicki, Stefan Labedzki, and Wiktor Pietrzak, Pabianice, Stanislaw Pieta and Stanislaw Paradowski, Lodz, Poland, and Josef Izdebski, deceased, late of Warsaw, Poland, by Alicja Maria Izdebska and Barbara Anieszka Izdebska, heirs, Warsaw, Poland, assignors to Pabianickie Zaklady Farmaceutyczne "Polfa" Przedsiebiorstwo, Pabianice, Poland
Continuation-in-part of application Ser. No. 406,930, Apr. 28, 1964. This application Oct. 29, 1968, Ser. No. 773,977
Claims priority, application Poland, May 11, 1963, 101,553; Dec. 9, 1963, 103,201
Int. Cl. C07d 51/06
U.S. Cl. 260—250    3 Claims

ABSTRACT OF THE DISCLOSURE

Two moles of 1-hydrazinophthalazine and one mole of ethyl chlorocarbonate are reacted to yield one mole of 1-carboethoxyhydrazinophthalazine in an organic solvent (e.g. ethanol). The 1-hydrazinophthalazine hydrochloride produced during the reaction, is filtered, the filtrate is evaporated under reduced pressure to a dry state and the residue is dissolved in hot hydrochloric acid to convert 1-carboethoxyhydrazinophthalazine into the hydrochloride which, after addition of dilute ethanol and cooling, crystallizes in the form of a raw product. This product is filtered and then crystallized from diluted ethanol for its purification. The pharmaceutical compound has been found to exert a slow but persistent hypotensive effect in hypertensive and normotensive animal subjects.

SPECIFICATION

This application is a continuation-in-part of our application Ser. No. 406,930, filed Apr. 28, 1964, now abandoned.

Our present invention relates to a process for the preparation of 1-carboethoxyhydrazinophthalazine hydrochloride.

In the above-mentioned copending application we have described a method of or process for the production of 1-carboethoxyhydrazinophthalazine hydrochloride which has been described there as a compound having valuable pharmacological properties and therapeutic characteristics. The compound has been found to exert a slow but persistent hypotensive effect in hyptertensive and normotensive animal subjects. For example, a substantial reduction in the blood pressure of cats is produced by the product with similar long-lasting effects in rabbits and other animals. The mode of action of this hypotensive product appears to be both central and peripheral. For example, the product has a central depressant action on the vasomotor center and exhibits the countereffects of nicotinamide. Peripherally, the drug appears to be effective at several levels. For example, it lowers sensitivity of the pressor receptors, it diminishes pressor reflexes after constriction of the carotoid artery and on occlusion of the respiratory tract, and has a sympathicolytic action which diminishes hypertension and vasoconstriction and antagonizes the action of adrenaline on the uterus.

In general terms, the drug has been found to be effective for the treatment of human hypertensive patients and patients with bronchial asthma when administered in doses of 40–400 mg. daily.

As has been pointed out in the earlier application, to date, there have been to the best of our knowledge no publications describing methods for the preparation of 1 - carboethoxyhydrazinophthalazine existing. Attempts have indeed been made to obtain this compound by co-action between 1-hydrazinophthalazine and ethyl chlorocarbonate at elevated temperatures without giving the desired results. The insufficiently identified compound obtained by this method differs essentially from 1-carboethoxyhydrazinophthalazine and from its hydrochloride and does not reveal the desired pharmacological properties.

The method according to the invention avoids the undesired ring closure during condensation of 1-hydrazinophthalazine with ethyl chlorocarbonate and renders it possible to obtain pure 1-carboethoxyhydrazinophthalazine hydrochloride with good yield and with the desired pharmacological properties.

The process according to the invention resides in that 1-hydrazinophthalazine is subjected at a suitable temperature to condensation with ethyl chlorocarbonate in the medium of an organic solvent which is mixable with water, or in an aqueous solution of said solvent, such a solvent being one which is unable to dissolve 1-hydrazinophthalazine hydrochloride.

Figure 1:
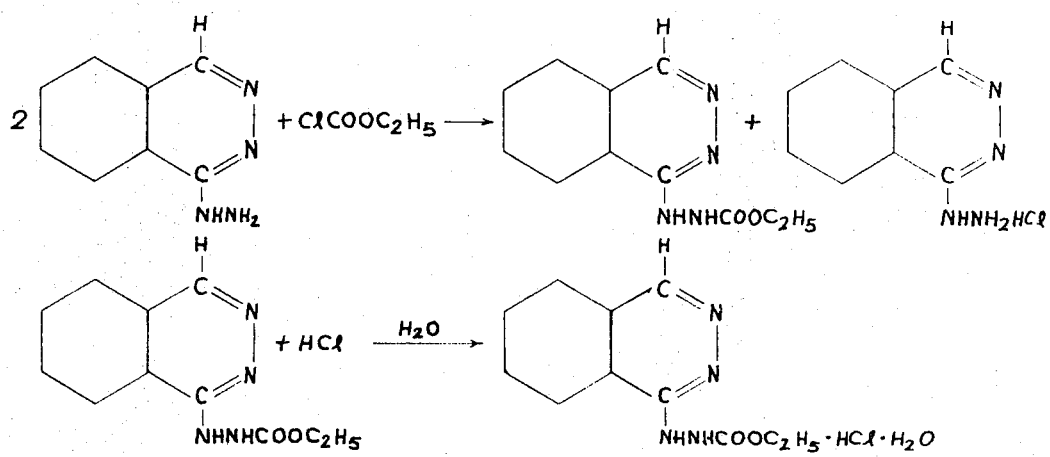
Figure 2:
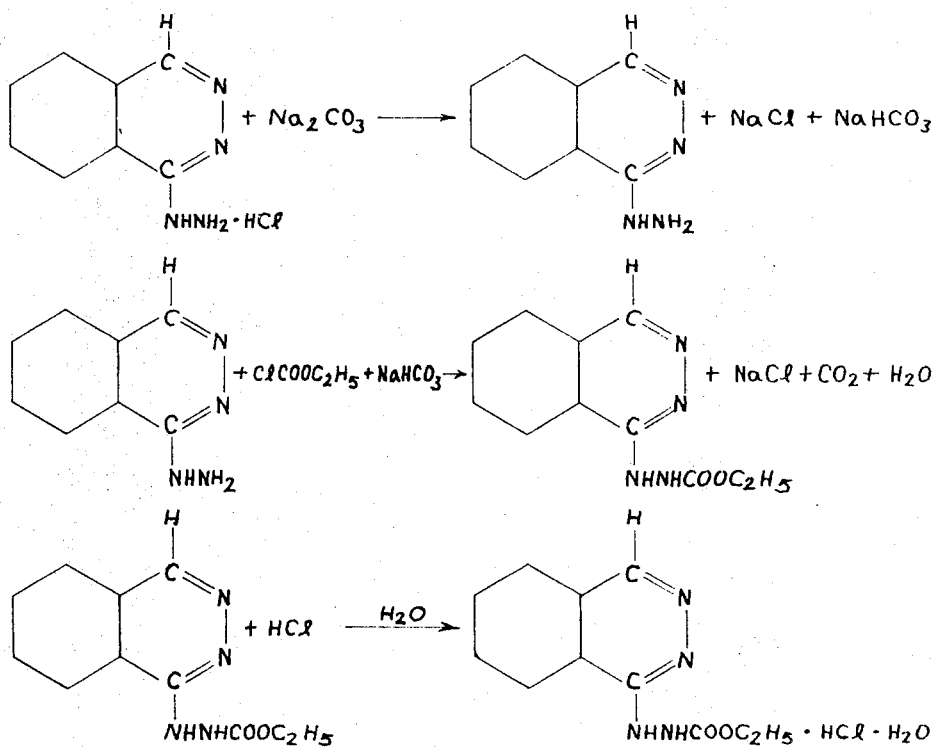

The invention is described in greater detail hereinafter with reference to the accompanying drawing in which FIGS. 1 and 2 are diagrams of two reaction schemes embodying the invention, and with reference to the specific examples.

The reaction of the present invention can proceed in accordance with the reaction scheme of FIG. 1.

Two moles of 1-hydrazinophthalazine and one mole of ethyl chlorocarbonate yield one mole of 1-carboethoxyhydrazinophthalazine and one mole of 1-hydrazinophthalazine hydrochloride. For this reason, for each mole of ethyl chlorocarbonate at least two moles of 1-hydrazinophthalazine must be used.

As the organic solvent mentioned above, ethanol is particularly suitable, but other solvents in which the 1-hydrazinophthalazine hydrochloride is insoluble, may also be used.

One of the embodiments of the invention provides that free 1-hydrazinophthalazine is used as starting material, the condensation reaction with ethyl chlorocarbonate being initially conducted at a temperature of below 0° C., and subsequently at elevated temperature, preferably not exceeding 120° C.

The 1-hydrazinophthalazine hydrochloride produced during the reaction, is filtered, the filtrate is evaporated under reduced pressure to a dry state and the residue is dissolved in hot hydrochloric acid to convert 1-carboethoxyhydrazinophthalazine into the hydrochloride which, after addition of dilute ethanol and cooling, crystallizes in the form of a raw product. This product is filtered and then crystallized from diluted ethanol for its purification.

An alternative method of carrying out the process according to the invention provides that 1-hydrazinophthalazine which has been stabilized by means of reducing agents, especially by means of hydrazine, is used as a starting material which fact enables the condensation reaction with ethyl chlorocarbonate to be started at once at a temperature of about 20° C.

After filtration of the separated 1-hydrazinophthalazine hydrochloride, the filtrate is acidified with hot hydrochloric acid, the solvent is only partly distilled off and the rest is then cooled for the purpose of crystallizing the raw 1-carboethoxyhydrazinophthalazine hydrochloride.

It may be noted that 1-carboethoxyhydrazinophthalazine hydrochloride is not subject to decomposition while being heated in the presence of certain solvents such as ethanol. As it has also been observed that the purification of raw 1-carboethoxyhydrazinophthalazine hydrochloride by crystallization from hydrochloric acid proceeds essentially better than from dilute ethyl alcohol, the above-obtained raw product is dissolved in hot hydrochloric acid, and allowed to stand for crystallization, whereupon the solid is filtered and dried.

The invention also provides for a modification of the above-described processes, which provides that the condensation reaction of 1-hydrazinophthalazine with ethyl chlorocarbonate is conducted in the presence of hydrogen chloride binding agents, especially salts of weak or of not too strong acids and of strong bases (e.g. sodium carbonate) or in the presence of free bases (e.g. sodium hydroxide). Due to this fact, 1-hydrazinophthalazine hydrochloride is not formed as a by-product during condensation, whereby the process is simplified by one stage, which fact also increases the yield of the process. This process proceeds according to the reaction scheme 4 of FIG. 2, one mole of hydrazinophthalazine reacting with one mole of ethyl chlorocarbonate. The reaction may be started at once at a temperature of 25–30° C.

The use of hydrogen-chloride binding agents renders it also possible to use as a starting material not only 1-hydrazinophthalazine stabilized by means of reducing agents, especially of hydrazine, but also its salt, especially hydrochloride. This is of practical importance because hydrochloride is considerably more stable than free 1-hydrazinophthalazine.

The following examples explain in greater detail the process according to the invention.

EXAMPLE I

A suspension of 13 g. of hydrazinophthalazine in 500 ml. of anhydrous ethanol is cooled, under agitation to a temperature of −10° C. To the suspension is added dropwise within 30 minutes a solution of 4.5 g. of ethyl chlorocarbonate in 150 ml. of anhydrous ethanol and the reaction mass is agitated for about 2 hours, maintaining a temperature of −10° C. The temperature is then raised to about 20° C. and stirring is continued for further 2 hours, whereupon heating is applied and boiling is maintained for 15 minutes. After cooling, the separated 1-hydrazinophthalazine hydrochloride is filtered and washed with anhydrous ethanol.

The filtrate is evaporated to a dry state under decreased pressure at a temperature of below 50° C. The residue in a quantity of 8.5 g. is dissolved in a boiling solution of 3 ml. of concentrated hydrochloric acid in 15 ml. of water, and after adding 5 ml. of 90%-ethanol the solution is cooled to a temperature of below 0° C.

The separated 1-carboethoxyhydrazinophthalazine hydrochloride is filtered and washed with anhydrous ethanol. 11.5 g. of a raw product are obtained which for the purpose of purification are dissolved in 15 ml. of boiling water with an addition of 10 ml. of 96%-ethanol and after cooling to below 0° C., the pure 1-carboethoxyhydrazinophthalazine hydrochloride is filtered. 9.8 g. of the product are obtained.

EXAMPLE II

In a round-bottom flask having a volume of 1 liter, provided with an agitator, a dropper and a thermometer, 13 g. of 1-hydrazinophthalazine are mixed with 500 ml. of anhydrous ethanol, and 4.7 g. of ethyl chlorocarbonate are dripped within 30 minutes into the solution having a temperature of 20° C. The dropper is then exchanged for a reflux condenser and the reaction mass is heated to boiling, whereupon the mixture is left to cool, and the separated 1-hydrazinophthalazine hydrochloride is filtered at room temperature and washed with anhydrous ethanol.

The filtrate in a quantity of 640 ml. is acidified by means of concentrated hydrochloric acid in the presence of Congo red and after distilling off about 500 ml. of ethanol, it is permitted to stand for crystallization at room temperature. After 24 hours the crystallized 1-carboethoxyhydrazinophthalazine hydrochloride is filtered and is washed with anhydrous ethanol.

13 g. of a raw product are obtained which for the purpose of cleaning are dissolved in 60 ml. of hot 5%-hydrochloric acid, 0.5 g. of activated carbon are added, the mixture is filtered hot and permitted to stand for crystallization. After 24 hours the product is filtered, washed with anhydrous ethanol and dried at 50°–55° C. 10 g. of pure 1-carboethoxyhydrazinophthalazine chloride are obtained what after deduction of the hydrazinophthalazine which has been recovered in form of hydrochloride, forms 76% of the theoretical yield.

EXAMPLE III

In a three-necked round-bottom flask having a volume of 250 ml., provided with an agitator, a dripping tunnel and a thermometer, 120 ml. of anhydrous ethanol and 5 g. of 1-hydrazinophthalazine hydrochloride are mixed together, whereupon 3.13 g. of well ground sodium carbonate are added and the mixture is agitated for 45 minutes at a temperature of 25°–30° C.

To the reaction mass is then added by portions ethyl chlorocarbonate in solution in ethanol in a voluminal ratio of 1:1, in an amount of 3 moles, maintaining a temperature of 25°–30° C.

After the exchange of the dripper for a reflux condenser the reaction mixture is heated to boiling, the hot solution is acidified by means of concentrated hydrochloric acid to change the paper color of Congo red and is then hot-filtered.

The filtrate is left for slow crystallization and after 24 hours the crystallized 1-carboethoxyhydrazinophthalazine is filtered and washed with anhydrous ethanol. The obtained raw product in a quantity of 6.4 g. is dissolved for cleaning it in 35 ml. of hot distilled water, is acidified with 5 ml. of concentrated hydrochloric acid, and is left for crystallization. After 24 hours the crystallized product is filtered, washed with 3 ml. of anhydrous ethanol and dried at a temperature of 50°–55° C. 5.3 g. of pure 1-carboethoxyhydrazinophthalazine hydrochloride are obtained which forms 72% of theoretical yield.

The product of Examples 1–3 has been found to be readily soluble in water; it is easily absorbed from the alimentary tract and hypodermic tissue, and has no irritating effect on mucous membranes. The compound has a relatively low acute toxicity. When administered to rats in a dosage of 10 mg./kg. orally and 3 mg./kg. subcutaneously for a period of 6 weeks, the product does not produce any manifest toxic symptoms in the form of changes in body weight or histological changes of parenchymatous organs.

The product exerts a slow but persistent hypotensive effect both in hypertensive and in normotensive subjects. A distinct hypotensive effect/lowering in blood pressure of 40–80 mm. Hg appears in cats, after doses of 0.5–5 mg./kg. The hypotensive effect, in potency and duration, is similar to that of hydralazine in analogous doses. In rabbits, a similar effect is obtained following a dosage of 2–5 mg./kg. The decrease in blood pressure following its administration has a slow course, the maximum fall appearing usually after 1–2 hours and persists up to 6 hours.

The mode of hypotensive action appears to be central and peripheral. It has a central depressant action on the vasomotor center, and inhibits the pressor effects of nicotinamide. Peripherally, the drug has several points of reception. It lowers the sensitivity of the pressor receptors— it diminishes the pressor reflexes after constriction of the carotid artery and on occlusion of the respiratory tract. It also has a sympathicolytic action, diminishing thereby hypertension and vasoconstriction produced by catecholamines or isoprenaline, and antagonizes the action of adrenaline on the uterus. The hypotensive effect is to a certain degree dependent also on parasympathicotonic action— both atropine and bilateral vagotonia markedly decrease the hypotensive effect of Binazin. The drug also appears to exert some myolytic action. Even after very small doses (0.3 mg./kg.) a decrease in tonus of cat's uterus in situ was recorded, whereas larger doses caused complete uterine paralysis, a lowering in tonus and cessation of intestinal peristaltic movements.

The product was used in 154 patients (139 patients with hypertension and 15 patents with bronchial asthma), the drug being administered in a dosage of from 40 to 400 mg. daily, most frequently 60 to 120 mg. In the treatment of hypertension with the product, the percentage of successful clinical results amounted to 71–81, this being indicated by a lowering of arterial blood pressure (systolic by 20–40 mm. Hg, diastolic by 12–15 mm. Hg) and by an improvement of the patients well-being and recession of a number of subjective disease symptoms.

We claim:

1. A process for producing 1-carboethoxyhydrazinophtalazine hydrochloride with pharmacological activity, comprising the steps of reacting 1-hydrazinophthalazine in a vehicle consisting of a mixture of water and an organic solvent mixable therewith but incapable of dissolving 1-hydrazinophthalazine hydrochloride with ethylchlorocarbonate for a period and at a temperature sufficient to produce 1-hydrazinophthalazine hydrochloride in the form of a precipitate and 1-carboethoxyhydrazinophthalazine in solution in said vehicle; separating the precipitated 1-hydrazinophthalazine hydrochloride from said vehicle by filtration, thereby forming a filtrate of the vehicle containing dissolved 1-carboethoxyhydrazinophthalazine acidifying said filtrate with hydrochloric acid to crystallize from the vehicle 1-carboethoxyhydrazinophthalazine hydrochloride; and recovering the crystals of 1-carboethoxyhydrazinophthalazine hydrochloride thus produced.

2. The process defined in claim 1 wherein the 1-hydrazinophthalazine is reacted in a molar ratio with the ethylchlorocarbonate of substantially 2:1, the organic solvent is ethanol, and the reaction is initially carried out at a temperature below 0° C.

3. The process defined in claim 1 wherein the 1-carboethoxyhydrazinophthalazine hydrochloride is purified by dissolving it in hydrochloric acid and precipitating purified crystals by addition of anhydrous ethanol to the resulting solution.

References Cited

FOREIGN PATENTS 1,038,548  10/1966  Great Britain _____ 260—250

NICHOLAS S. RIZZO, Primary Examiner

U.S. Cl. X.R.

424—250